US007849412B2

(12) United States Patent
French

(10) Patent No.: US 7,849,412 B2
(45) Date of Patent: Dec. 7, 2010

(54) SYSTEM AND METHOD FOR GENERATING A WEB CONTROL IN A WINDOWS DEVELOPMENT ENVIRONMENT

(75) Inventor: Jeffrey K. French, Corinth, TX (US)

(73) Assignee: Computer Associates Think, Inc., Islandia, NY (US)

(*) Notice: Subject to any disclaimer, the term of this patent is extended or adjusted under 35 U.S.C. 154(b) by 831 days.

(21) Appl. No.: 10/851,001

(22) Filed: May 21, 2004

(65) Prior Publication Data

US 2005/0262517 A1    Nov. 24, 2005

(51) Int. Cl.
  *G06F 3/00*    (2006.01)
  *G06F 3/048*    (2006.01)
(52) U.S. Cl. .................. 715/763; 715/762; 715/967
(58) Field of Classification Search ............. 715/967, 715/762, 763
  See application file for complete search history.

(56) References Cited

U.S. PATENT DOCUMENTS

| | | | | |
|---|---|---|---|---|
| 5,335,320 | A | 8/1994 | Iwata et al. | 717/110 |
| 5,347,629 | A | 9/1994 | Barrett et al. | 715/762 |
| 5,909,214 | A * | 6/1999 | Consolatti et al. | 715/764 |
| 5,940,075 | A | 8/1999 | Mutschler, III et al. | |
| 5,956,029 | A | 9/1999 | Okada et al. | 715/746 |
| 5,974,430 | A | 10/1999 | Mutschler, III et al. | 715/207 |
| 6,003,047 | A | 12/1999 | Osmond et al. | 715/210 |
| 6,005,568 | A | 12/1999 | Simonoff et al. | 715/744 |
| 6,115,040 | A | 9/2000 | Bladow et al. | |
| 6,157,936 | A | 12/2000 | Mutschler, III et al. | |
| 6,173,316 | B1 * | 1/2001 | De Boor et al. | 709/218 |

(Continued)

FOREIGN PATENT DOCUMENTS

EP    0622729    11/1994

(Continued)

OTHER PUBLICATIONS

Mitchell, Scott, "ASP.NET Data Web Congtrols Kick Start", Feb. 13, 2003, SAMS, All pages.*

(Continued)

*Primary Examiner*—William L Bashore
*Assistant Examiner*—Jordany Núñez
(74) *Attorney, Agent, or Firm*—Pillsbury Winthrop Shaw Pittman LLP

(57) ABSTRACT

This disclosure provides a system and method for generating a .NET web control in a Windows development environment. In one embodiment, an example method for generating a .NET web control in a Windows development environment includes initializing a design engine for Windows-based graphical user interface (GUI) forms, with the design engine operable to present a plurality of Windows controls to a user and one of the plurality of Windows controls comprising a web control host. A web control host object is instantiated based on the web control host at least partially in response to a request by the user. The web control host object is operable to present a plurality of web controls through the design engine. At least partially in response to a selection by the user of one of the web controls, a web control object is created via the web control host object. A Windows-based GUI form is generated using the design engine, with the GUI form comprising at least the web control object.

22 Claims, 13 Drawing Sheets

U.S. PATENT DOCUMENTS

| | | | |
|---|---|---|---|
| 6,177,941 B1 | 1/2001 | Haynes et al. | 715/810 |
| 6,212,535 B1 | 4/2001 | Weikart et al. | 715/207 |
| 6,222,537 B1 | 4/2001 | Smith et al. | 715/762 |
| 6,249,844 B1 | 6/2001 | Schloss et al. | 711/122 |
| 6,266,681 B1 | 7/2001 | Guthrie | 715/501.1 |
| 6,275,226 B1 | 8/2001 | Uchida et al. | |
| 6,300,947 B1 | 10/2001 | Kanevsky | 345/333 |
| 6,323,884 B1 | 11/2001 | Bird et al. | 715/810 |
| 6,342,907 B1 | 1/2002 | Petty et al. | 715/762 |
| 6,430,556 B1 | 8/2002 | Goldberg et al. | 707/4 |
| 6,456,307 B1 | 9/2002 | Bates et al. | 345/838 |
| 6,476,828 B1 | 11/2002 | Burkett et al. | 715/760 |
| 6,532,463 B1 | 3/2003 | Robbins et al. | |
| 6,628,305 B1 | 9/2003 | Hong et al. | 715/734 |
| 6,701,383 B1 | 3/2004 | Wason et al. | 719/328 |
| 6,701,513 B1 | 3/2004 | Bailey | 717/109 |
| 6,802,053 B1 * | 10/2004 | Dye et al. | 717/113 |
| 6,961,750 B1 | 11/2005 | Burd et al. | 709/203 |
| 7,065,744 B2 | 6/2006 | Barker et al. | 717/109 |
| 7,069,553 B2 | 6/2006 | Narayanaswamy et al. | 717/173 |
| 7,124,398 B2 | 10/2006 | Chen et al. | 717/106 |
| 7,143,359 B2 | 11/2006 | Aggarwal et al. | 715/760 |
| 7,159,183 B1 * | 1/2007 | Kudukoli et al. | 715/762 |
| 7,191,404 B2 | 3/2007 | Barker et al. | 715/760 |
| 7,216,298 B1 | 5/2007 | Ballard et al. | 715/760 |
| 7,219,305 B2 | 5/2007 | Jennings | 715/761 |
| 7,761,842 B2 | 7/2010 | Udler | 717/106 |
| 7,765,523 B2 | 7/2010 | Kooy | 717/106 |
| 2001/0032220 A1 | 10/2001 | Ven Hoff | 707/513 |
| 2002/0049867 A1 | 4/2002 | Kumagai | 709/319 |
| 2002/0063734 A1 | 5/2002 | Khalfay et al. | 715/744 |
| 2002/0085020 A1 | 7/2002 | Carroll | 345/700 |
| 2002/0101448 A1 | 8/2002 | Sanderson | 345/762 |
| 2002/0109718 A1 | 8/2002 | Mansour et al. | 715/744 |
| 2002/0149619 A1 | 10/2002 | Sauer | 345/762 |
| 2002/0152244 A1 | 10/2002 | Dean et al. | 707/530 |
| 2002/0188633 A1 | 12/2002 | Davis et al. | 707/513 |
| 2003/0025732 A1 | 2/2003 | Prichard | 715/765 |
| 2003/0160822 A1 | 8/2003 | Belz et al. | 345/762 |
| 2003/0193521 A1 | 10/2003 | Chen et al. | 715/762 |
| 2004/0001092 A1 | 1/2004 | Rothwein et al. | 345/763 |
| 2004/0021688 A1 | 2/2004 | Phillips | 345/762 |
| 2004/0061713 A1 | 4/2004 | Jennings | 345/700 |
| 2004/0168121 A1 | 8/2004 | Matz | 715/513 |
| 2004/0205571 A1 | 10/2004 | Adler et al. | 715/513 |
| 2005/0010877 A1 | 1/2005 | Udler | 715/826 |
| 2005/0010901 A1 | 1/2005 | Udler | 717/109 |
| 2005/0044526 A1 | 2/2005 | Kooy | 717/106 |
| 2006/0129982 A1 | 6/2006 | Doyle | 717/115 |

FOREIGN PATENT DOCUMENTS

| | | |
|---|---|---|
| WO | WO 00/29950 | 5/2000 |
| WO | WO 02/44897 | 6/2002 |

OTHER PUBLICATIONS

International Search Report issued in International Application No. PCT/US2005/017010; Sep. 2, 2005; 6 pages.

Marc Abrams & Contantinos Phanouriou: "UIML: An XML Language for Building Device—Independent User Interfaces"; XML Conference Proceedings, Proceedings of XML; Dec. 1999; pp. 1-15.

Firoozye, R.; "A Cross-Platform Plug-In Toolkit—Creating Dynamically Extendable Applications"; *Dr. Dobbs Journal*; Redwood City, CA, USA; vol. 18, No. 6; Jun. 1993; pp. 120-134.

Anonymous; "Plug-In Guide"; 1998; pp. 1-32.

Anonymous; "Plug-In Guide, Chapter I—Plug-In Basics"; http://Developer.netscape.com/docs/manuals/communicator/plugindex.htm; Jan. 15, 1997; pp. 1-19.

Anonymous; "Introduction to a XUL Document"; Jun. 30, 1999.

PCT International Search Report issued in International Application No. PCT/US2004/021833; Jun. 17, 2005; 7 pages.

Object Technology International, "Eclipse Platform Technical Overview", Jul. 2001.

International Business Machines Corporation; "Multi-Modal Data Access"; Research Disclosure; Kenneth Mason Publications; Westbourne, GB, vol. 426, No. 114; Oct. 1999.

International Search Report dated May 27, 2005 issued in counterpart International Application No. PCT/US2004/021901; 7 pages.

International Search Report issued in International Application No. PCT/US2004/021969, Sep. 12, 2005, 7 pages.

* cited by examiner

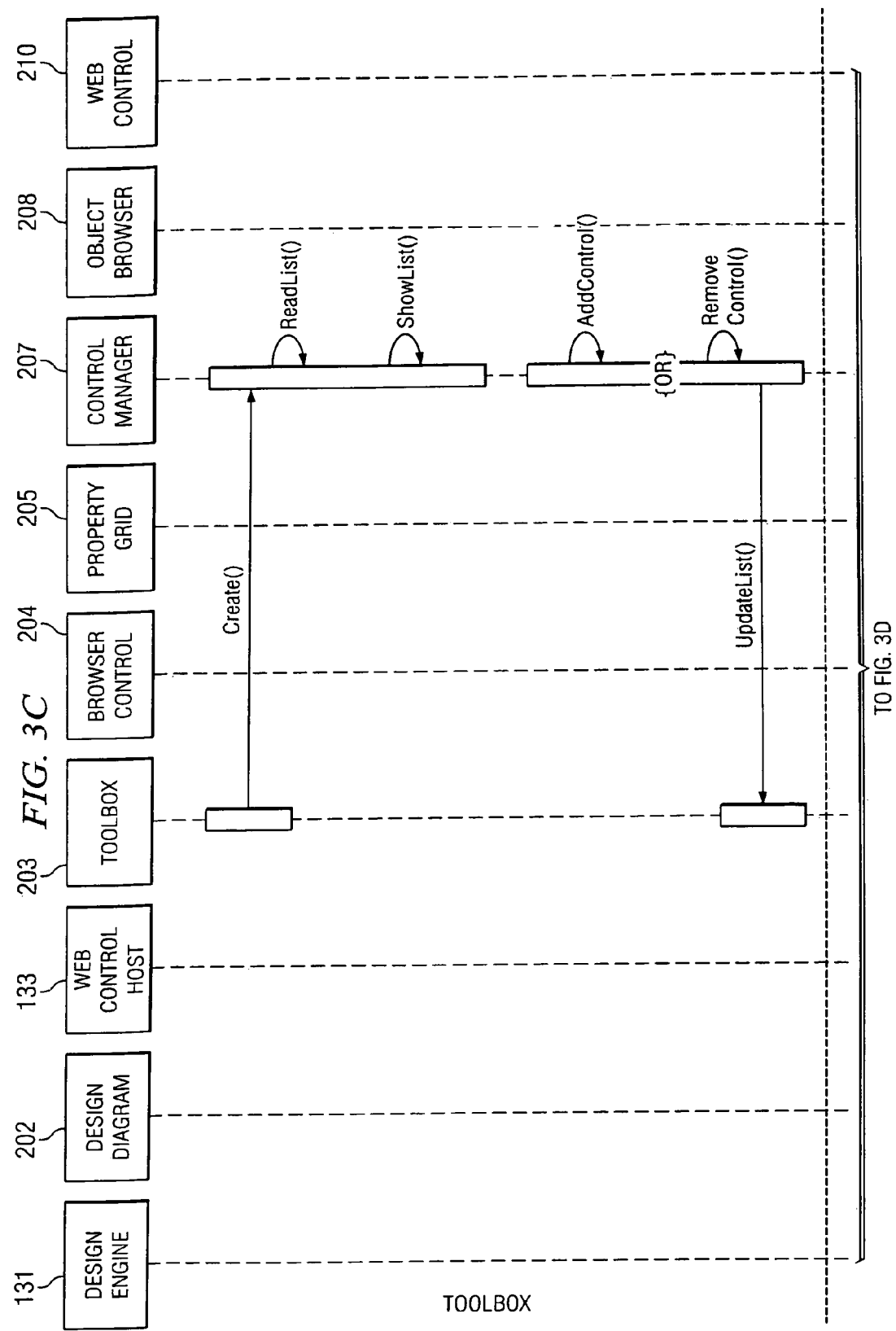

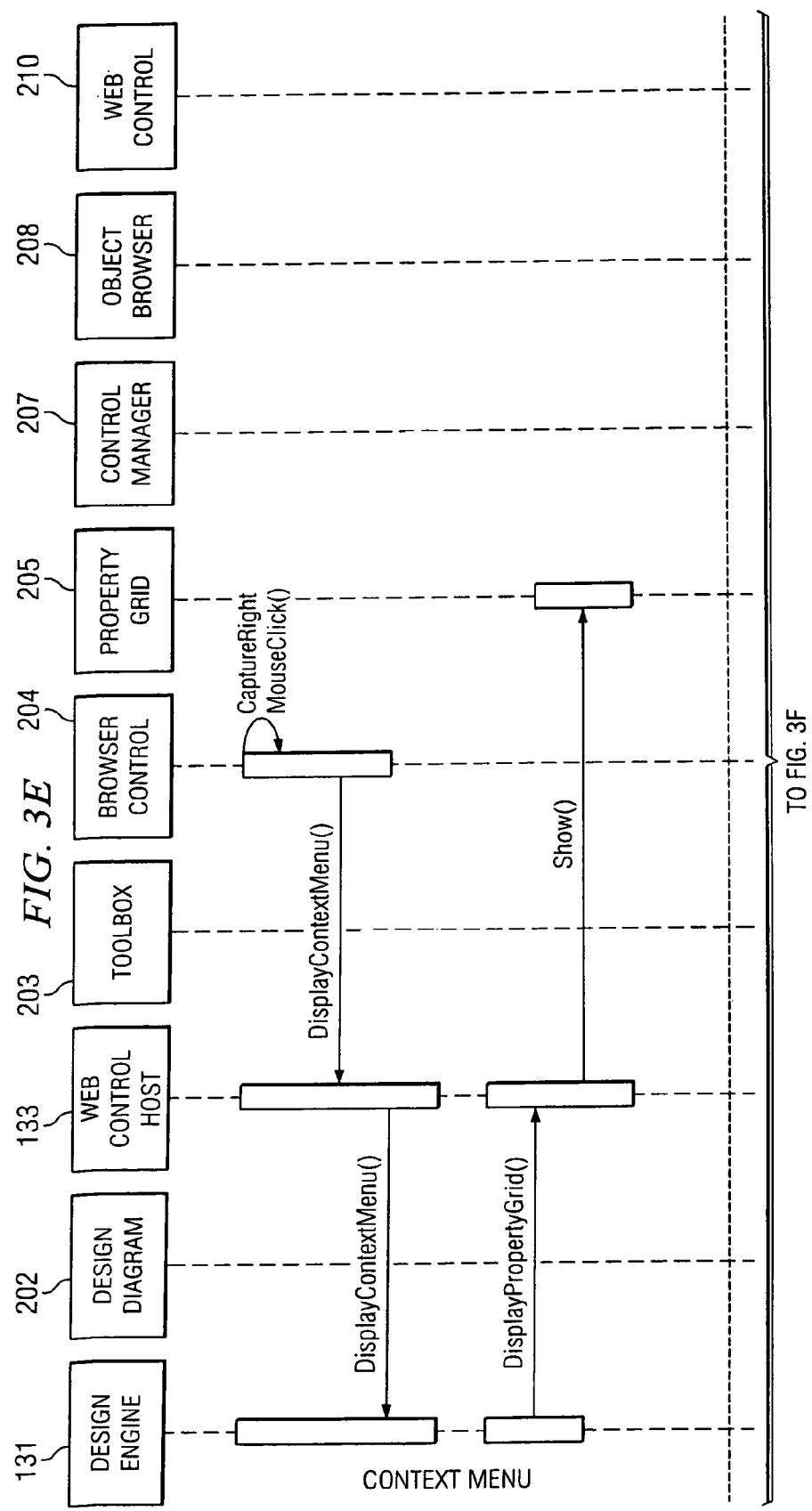

116d

116e

SYSTEM AND METHOD FOR GENERATING A WEB CONTROL IN A WINDOWS DEVELOPMENT ENVIRONMENT

TECHNICAL FIELD

This disclosure generally relates to software application development and, more specifically, to a system and method for generating a web control in a Windows development environment.

BACKGROUND

Microsoft Windows applications typically present a graphical user interface (GUI) front-end to a user. This front-end includes one or more displays or windows, each normally including task bars, lists, buttons, and other graphical elements. The windows and other graphical elements are often part of standard Windows controls offered by Microsoft Windows. Conventional Windows development tools allow a developer to select Windows controls for insertion into a model of a GUI window. This model may then be used for generation into a portion of the front-end for the application. These development tools may also provide tools that allow the developer to visually incorporate various business rules into the back-end or engine of the application.

SUMMARY

This disclosure provides a system and method for generating a web control in a Windows development environment. In one embodiment, an example method for generating a web control in a Windows development environment includes initializing a design engine for Windows-based graphical user interface (GUI) forms, with the design engine operable to present a plurality of Windows controls to a user and one of the plurality of Windows controls comprising a web control host. A web control host object is instantiated based on the web control host at least partially in response to a request by the user. The web control host object is operable to present a plurality of web controls through the design engine. At least partially in response to a selection by the user of one of the web controls, a web control object is created or invoked via the web control host object. A Windows-based GUI form is generated using the design engine, with the GUI form comprising at least the web control object. The details of one or more embodiments of the invention are set forth in the accompanying drawings and the description below. Particular features, objects, and advantages of the invention will be apparent from the description and drawings and from the claims.

DESCRIPTION OF DRAWINGS

FIGS. 3A-F illustrate portions of a sequence diagram describing example operation of the components of FIG. 2 in accordance with one embodiment of the present disclosure;

DETAILED DESCRIPTION

Figure 1:
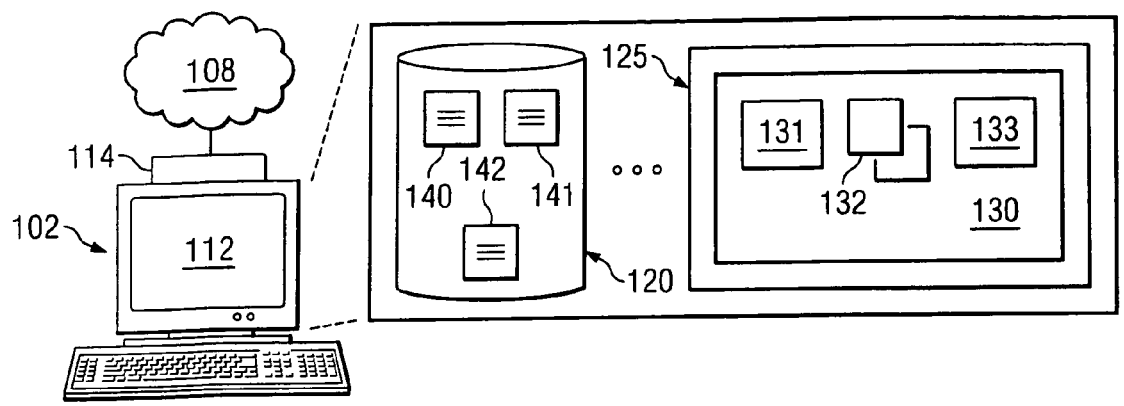
FIG. 1 illustrates a system for generating web forms in accordance with one embodiment of the present disclosure.

FIG. 1 illustrates a system 100 for developing or generating web forms in accordance with one embodiment of the present disclosure. Generally, system 100 provides a developer with one development environment operable to generate both Microsoft Foundation Class (MFC) applications and .NET web forms. Therefore, system 100 may allow the developer to easily model a Windows-based form with both standard Windows controls and .NET and third party web controls. System 100 may also improve effectiveness and allow the developer to quickly leverage new technologies in a standard development environment. At a high level, system 100 includes a development workstation 102 operable to present a development environment 130 for Windows-based applications, automatically instantiate a web control host, dynamically embed or host the web control host within a standard Windows control, and generate a Windows form including one or more web controls using, among other things, the web control host. System 100 is typically a distributed client/server system that allows the user of workstation 102 to model Windows-based forms and publish or otherwise distribute the generated form to an enterprise for any appropriate purpose. But system 100 may be a standalone computing environment or any other suitable environment without departing from the scope of this disclosure. The term "dynamically," as used herein, generally means that certain processing is determined, at least in part, at run-time based on one or more variables. The term "automatically," as used herein, generally means that the appropriate processing is substantially performed by at least part of system 100. It should be understood that "automatically" further contemplates any suitable user or developer interaction with system 100 without departing from the scope of this disclosure.

Workstation 102 includes memory 120 and processor 125 and comprises an electronic computing device operable to receive, transmit, process, and store data associated with system 100. Workstation 102 is any local or remote computing device operable to present a developer or other user with Windows development environment 130 via a GUI 112. While not illustrated, workstation 102 may comprise a standalone computer, part of a distributed network in an enterprise, or any other type of computer. For example, workstation 102 may comprise a computer that includes an input device, such as a keypad, touch screen, mouse, or other device that can accept information, and an output device that conveys information associated with the operation of workstation 102, including digital data, visual information, or GUI 112. Generally, FIG. 1 provides merely one example of computers that may be used with the disclosure. As used in this document, the term "computer" is intended to encompass a personal computer, touch screen terminal, workstation, network computer, kiosk, wireless data port, wireless or wireline phone, personal data assistant (PDA), one or more processors within these or other devices, or any other suitable processing device. For example, the present disclosure contemplates computers other than general purpose computers as well as computers without conventional operating systems. Workstation 102 may be adapted to execute any operating system including Linux, UNIX, Windows, Windows Server, or any other suitable operating system operable to present windows. According to one embodiment, workstation 102 may be communicably coupled with a web server and/or a mail server (not illustrated). Both the input device and output device may include fixed or removable storage media such as a magnetic computer disk, CD-ROM, or other suitable media to both receive input from and provide output to users of workstation 102 through the display, namely GUI 112. As used herein, "workstation 102," "developer," and "user" may be used interchangeably as appropriate without departing from the scope of this disclosure. Moreover, for ease of illustration, each workstation 102 is described in terms of being used by one user. But this disclosure contemplates that many users may use one computer or that one user may use multiple computers to develop GUI forms via GUI 112.

Workstation 102 includes processor 125. Processor 125 executes instructions and manipulates data to perform the operations of workstation 102 such as, for example, a central processing unit (CPU), a blade, an application specific integrated circuit (ASIC), or a field-programmable gate array (FPGA). Although FIG. 1 illustrates a single processor 125 in workstation 102, multiple processors 125 may be used according to particular needs and reference to processor 125 is meant to include multiple processors 125 where applicable. In the illustrated embodiment, processor 125 executes Windows development environment 130, which performs at least a portion of the design and generation of a Windows GUI form.

Windows development environment 130 could include any software, firmware, or combination thereof operable to present a design engine 131 for developing, customizing, generating, and/or testing standard Microsoft Windows applications, including graphical user interface (GUI) forms. For example, Windows applications typically present one or more GUI forms that may be standard Win32 interfaces with SDI/MDI-style (Single Document Interface/Multiple Document Interface) displays presenting dockable and floatable toolboxes, tabbed treeviews, help, or other graphical elements based on Windows controls 132. But each GUI form may include any appropriate standard Windows, Windows-based, Windows-compatible or other windowed interface features. Windows development environment 130 may be written or described in any appropriate computer language including C, C++, Java, J#, Visual Basic, assembler, any suitable version of 4GL, and others or any combination thereof. It will be understood that while Windows development environment 130 is illustrated in FIG. 1 as multiple modules such as, for example, a design engine 131 and a web control host 133 (as shown in more detail in FIGS. 2A-B), the features and functionality performed by this engine may be performed by a single multi-tasked module. Further, while illustrated as internal to workstation 102, one or more processes associated with Windows development environment 130 may be stored, referenced, or executed remotely. Moreover, Windows development environment 130 may be a child or sub-module of another software module (not illustrated) without departing from the scope of this disclosure: In the illustrated embodiment, Windows development environment 130 includes or is communicably coupled with design engine 131, a plurality of Windows controls 132, and web control host 133. At a high level, design engine 131 is any algorithm, function, method, library, service, window, diagram box, module, or application implementing the functionality for developing and/or generating the GUI form portion of the Windows application. For example, design engine 131 may be a diagram operable to present a single access to the developer for some or all of the form design objects. For ease of understanding, design engine 131 is illustrated as a sub-module of Windows development environment 130. But it will be understood that design engine 131 and development environment 130 may be used interchangeably as appropriate.

Windows control 132 is a child window, frame, or other graphical element operable to perform standard Windows input/out (I/O) functions. For example, Windows control 132 may operable to receive typed text or other options and to instruct a parent window or dialog box to execute an action or command. In another example, a rendered Windows control 132 may provide a variety of services such as, for example, viewing and editing text or other graphics, executing commands, and others. It will be understood that Windows control 132 may provide none, some, or all of these example abilities or services, as well as other abilities or services, without departing from the scope of this disclosure. It will be understood that Windows control 132 may be written or described in any appropriate language or based on Microsoft Foundation Class (MFC) libraries, such as MFC CWnd, without departing from the scope of this disclosure. In one embodiment, at least one Windows control 132 may be a non-standard Windows control 132, such as being operable to host web control host 133.

Web control host 133 is any algorithm, function, method, library, service, module, or application operable to be imported into Windows development environment 130 and, once loaded, to substantively function as a standard Windows control 132. At a high level, web control host 133 is further operable to present a plurality of web controls 210 to the developer for insertion, embedding, or referencing in the GUI form in Windows development environment 130. For example web control host 133 may present one or more of the following example web controls 210: ad rotator, button, calendar, checkbox, compare validator, data grid, hyperlink, image, link button, radio button, table, and/or text box. Of course, these web controls 210 are for example purposes only and web controls 210 may include any appropriate Microsoft .NET web control, as well as any suitable third party web control without departing from the scope of this disclosure. Moreover, web control host 133 may include or reference ASP.NET HTML controls, Windows forms controls, other non-standard controls, or any derivative thereof without departing from the scope of this disclosure. Web control host 133 may be written or described in any appropriate language including C, C++, Java, Visual Basic, assembler, any suitable version of 4GL, and others or any combination thereof. In one embodiment, web control host 133 may include a plurality of managed assemblies implemented through an unmanaged dynamic link library (DLL).

Memory 120 may include any local or remote memory or database module and may take the form of volatile or non-volatile memory including, without limitation, magnetic media, optical media, random access memory (RAM), read-only memory (ROM), removable media, or any other suitable memory component. In the illustrated embodiment, memory 120 includes .NET library 140 and third party list 141, but may memory 120 also include any other appropriate data such as form templates, DLLs, generated applications, and default parameters. .NET library 140 may comprise any file, table, or executable operable to present standard web controls to the user for input into a Windows GUI form. For example, .NET library 140 may include or reference System.Web.UI.Web-Controls.

Third party list 141 include any parameters, variables, tags, policies, algorithms, or rules operable to store a list of third party web controls for use by Windows development environment 130. For example, third party list 141 may comprise a persistent file for storing available third party web controls, with at least a portion of the third party web controls derived from standard web controls. In another example, a portion of third party list 141 may include ASP.NET HTML controls or Windows Forms controls. In one embodiment, third party list 141 is one or more eXtensible Markup Language (XML) documents or other data structure including tags. In another embodiment, third party list 141 may store or define various data structures as in a relational database described in terms of SQL statements or scripts, Virtual Storage Access Method (VSAM) files, flat files, Btrieve files, comma-separated-value (CSV) files, internal variables, or one or more libraries. In short, third party list 141 may comprise one table or file or a plurality of tables or files stored on one computer or across a plurality of computers in any appropriate format. Moreover, third party list 141 may be local or remote without departing from the scope of this disclosure and store any type of appropriate data. Returning to the XML embodiment, third party list 141 may comprise the following high-level logical format:

```
<?xml version="1.0" encoding="utf-8" ?>
<ThirdPartyControls>
    <WebControl>
        <Assembly>Fully qualified path of the Assembly
containing the Web Control</Assembly>
        <FullName>FullName of the Assembly containing the
Web Control</FullName>
        <Type>The 'Type' of Web Control added to the
Toolbox from the Assembly</Type>
    </WebControl>
    <WebControl>
        . . .
    </WebControl>
    <WindowControl>
        [other parameters or tags]
    </WindowControl>
</ThirdpartyControls>
```

Generally, the above logical format provides an easily customizable, yet standard format operable to be used by design engine 131. It will be understood that the preceding example third party list 141 is for illustration purposes only and third party list 141 may be in any logical and/or physical format operable to be processed by any processing component and include none, some, or all of the illustrated attributes, variables, or tags as well additional attributes, variables, or tags not listed.

Object browser assembly list 142 is a list, array, presentation, or other data structure for information from the .NET Global Assembly Cache. But object browser assembly list 142 may evidence or reference external assemblies without departing from the scope of the disclosure. As with third party list 141, object browser assembly list 142 may be one or more XML documents or other data structure including tags. In another embodiment, object browser assembly list 142 may store or define various data structures as in a relational database described in terms of SQL statements or scripts, VSAM files, flat files, Btrieve files, CSV files, internal variables, or one or more libraries. In short, object browser assembly list 142 may comprise one table or file or a plurality of tables or files stored on one computer or across a plurality of computers in any appropriate format. Moreover, object browser assembly list 142 may be local or remote without departing from the scope of this disclosure and store any type of appropriate data. The format of the example XML file may be:

```
<?xml version="1.0" encoding="utf-8" ?>
<GeneralAssemblies>
    <Assembies>
        <Assembly> qualified path of the Assembly
containing the Web Control</Assembly>
    </Assemblies>
</GeneralAssemblies>
```

It will be understood that the preceding example object browser assembly list 142 is for illustration purposes only. Object browser assembly list 142 may be in any logical and/or physical format operable to be processed by any processing component and include none, some, or all of the illustrated attributes, variables, or tags as well additional attributes, variables, or tags not listed.

GUI 112 comprises a graphical user interface operable to allow the user of workstation 102 to interface with at least a portion of system 100, such as development environment 130, for any suitable purpose. Generally, GUI 112 provides the user of workstation 102 with an efficient and user-friendly presentation of data provided by or communicated within system 100. In one embodiment, GUI 112 presents a GUI form template and a front-end for design engine 131 to the user. But GUI 112 may comprise any of a plurality of customizable frames or views having interactive fields, pull-down lists, toolboxes, property grids, and buttons operated by the user. Moreover, it should be understood that the term graphical user interface may be used in the singular or in the plural to describe one or more graphical user interfaces and each of the displays of a particular graphical user interface. Therefore, GUI 112 contemplates any graphical user interface, such as a generic web browser or touch screen, that processes information in system 100 and efficiently presents the results to the user. Workstation 102 can communicate data to the developer, a web server, or an enterprise server via the web browser (e.g., Microsoft Internet Explorer or Netscape Navigator) and receive the appropriate HTML or XML responses using network 108 via example interface 114.

Workstation 102 may also include interface 114 for communicating with other computer systems, such as a server, over network 108 in a client-server or other distributed environment. In certain embodiments, workstation 102 receives third party web controls for storage in memory 120 and/or processing by processor 125. In another embodiment, workstation 102 may publish generated GUI forms to a web or other enterprise server via interface 114. Generally, interface 114 comprises logic encoded in software and/or hardware in a suitable combination and operable to communicate with network 108. More specifically, interface 114 may comprise software supporting one or more communications protocols associated with communications network 108 or hardware operable to communicate physical signals.

Network 108 facilitates wireless or wireline communication between computer workstation 102 and any other local or remote computer, such as a web server. Indeed, while illustrated as one network, network 108 may be two or more networks without departing from the scope of this disclosure, so long as at least portion of network 108 may facilitate communications between components of system 100. In other words, network 108 encompasses any internal or external network, networks, sub-network, or combination thereof operable to facilitate communications between various computing components in system 100. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation, Windows development engine 130 presents a GUI form template or model to a developer. Using development environment 130, the developer is able to select one or more windows controls 132, at least one of which is associated with web control host 133. If the selection is the windows control 132 associated with web control host 133, then Windows development environment 130 instantiates the web control host object. The web control object presents a toolbox of the various web controls available for insertion in the GUI form template and also allows the developer to add or remove third party web controls for subsequent use. At any appropriate time (such as automatically or in response to a request from the developer), Windows development environment 130 generates or otherwise renders a Windows GUI form with one or more web controls based on the designed GUI form template.

Figure 2:
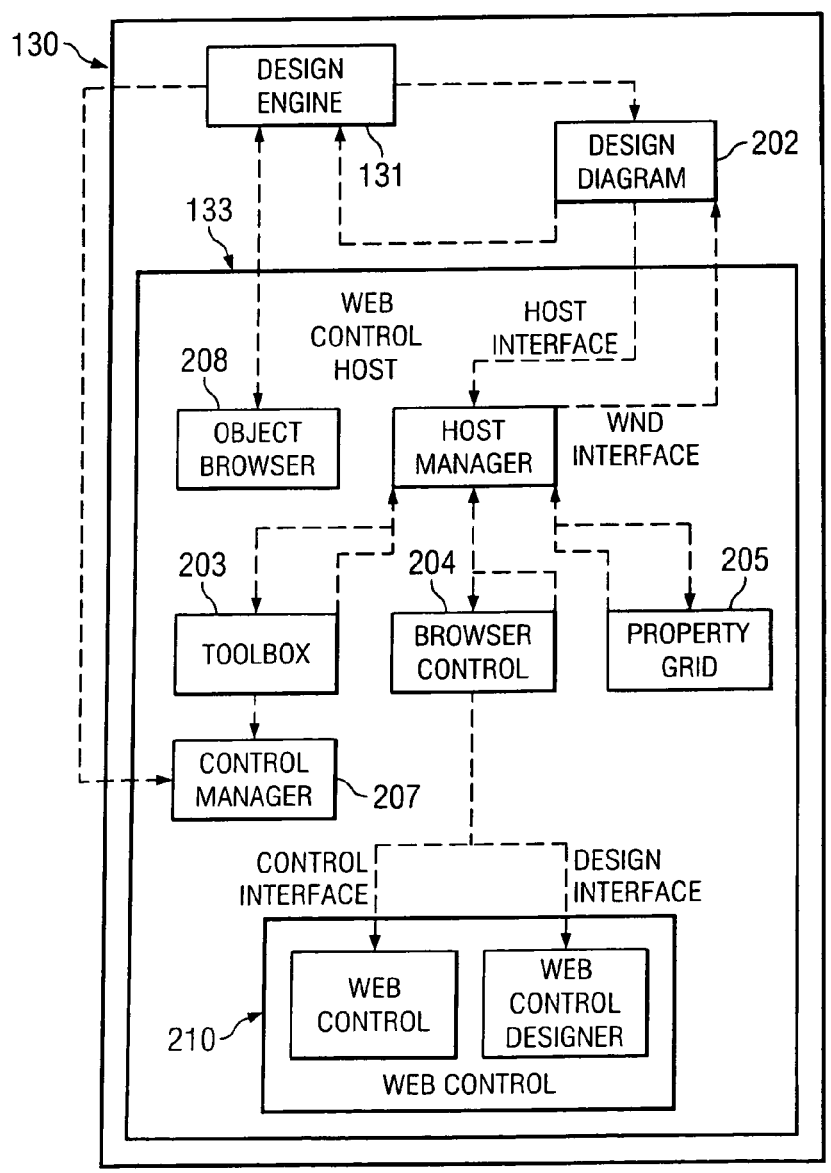
FIG. 2 illustrates one embodiment of distributed Windows development environment in the system of FIG. 1.
Figure 3A:
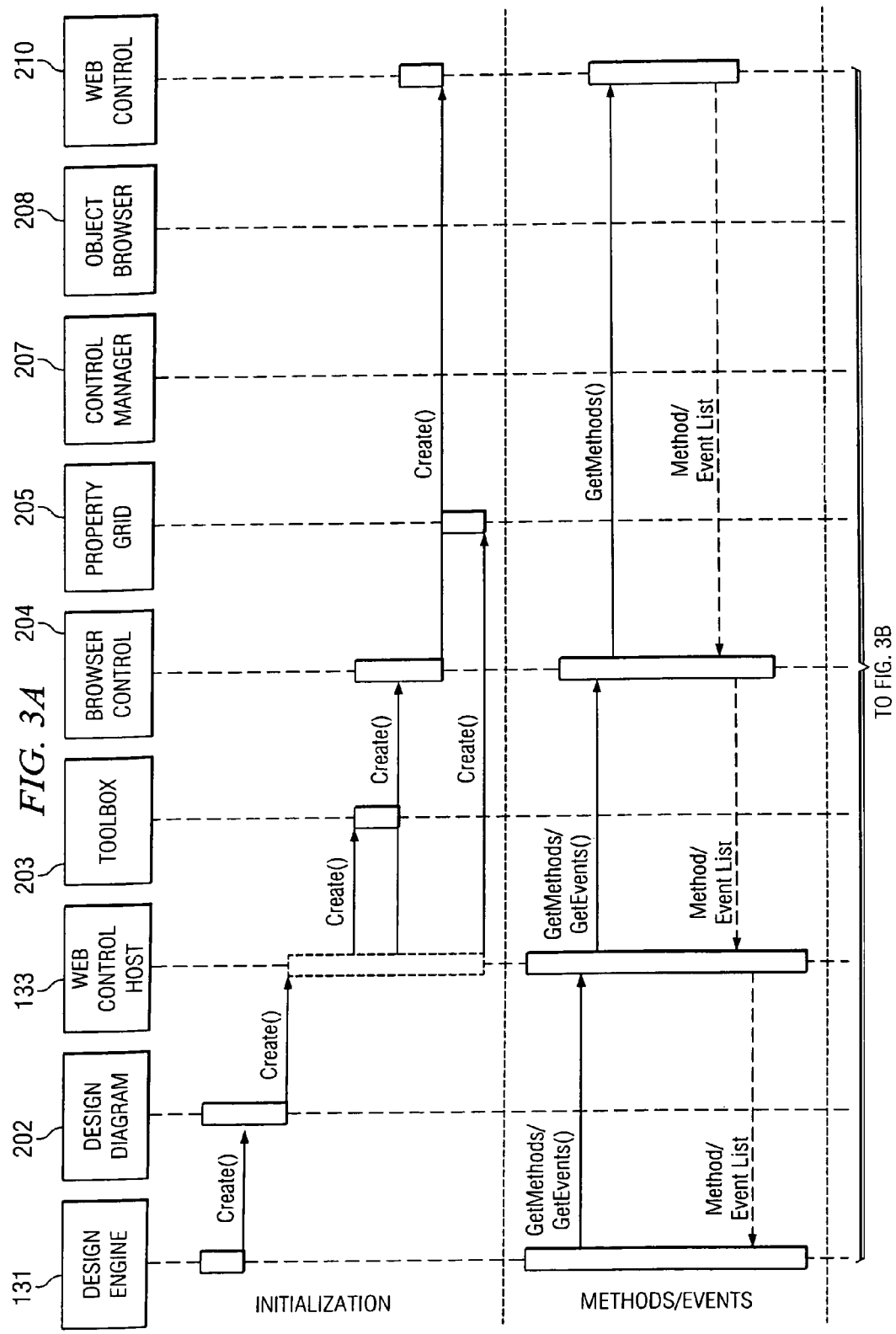
Figure 3B:
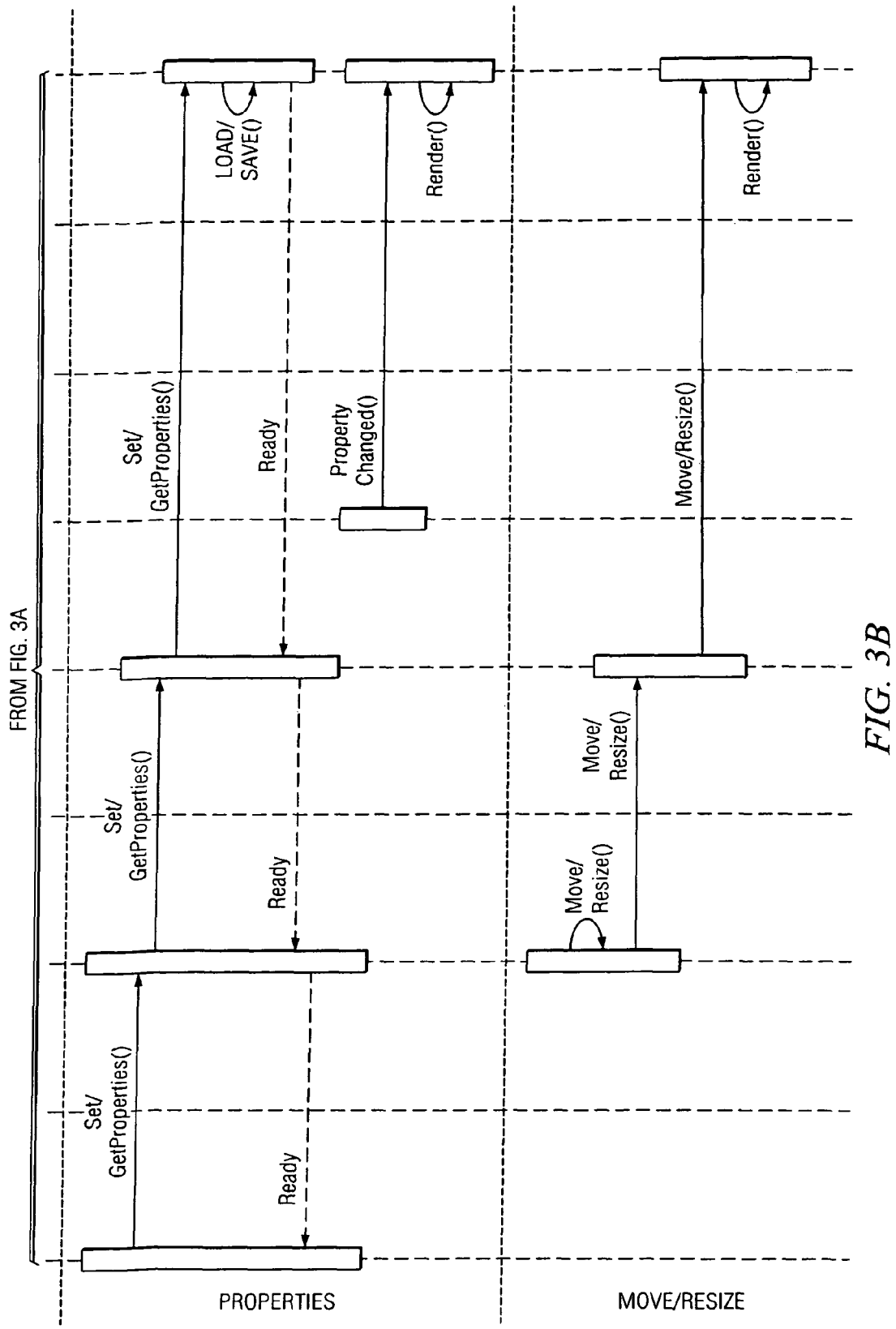
Figure 3D:
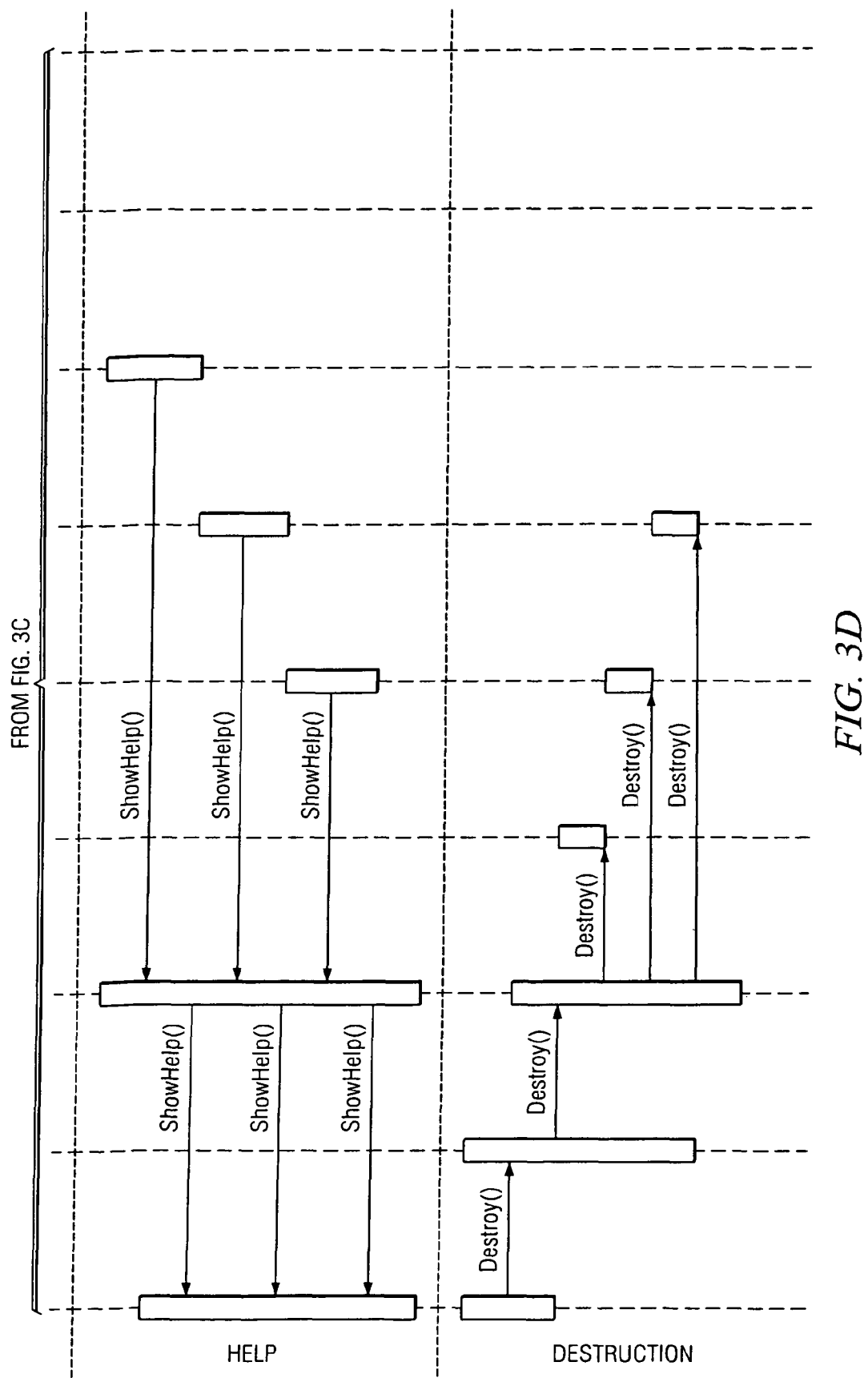
Figure 3F:
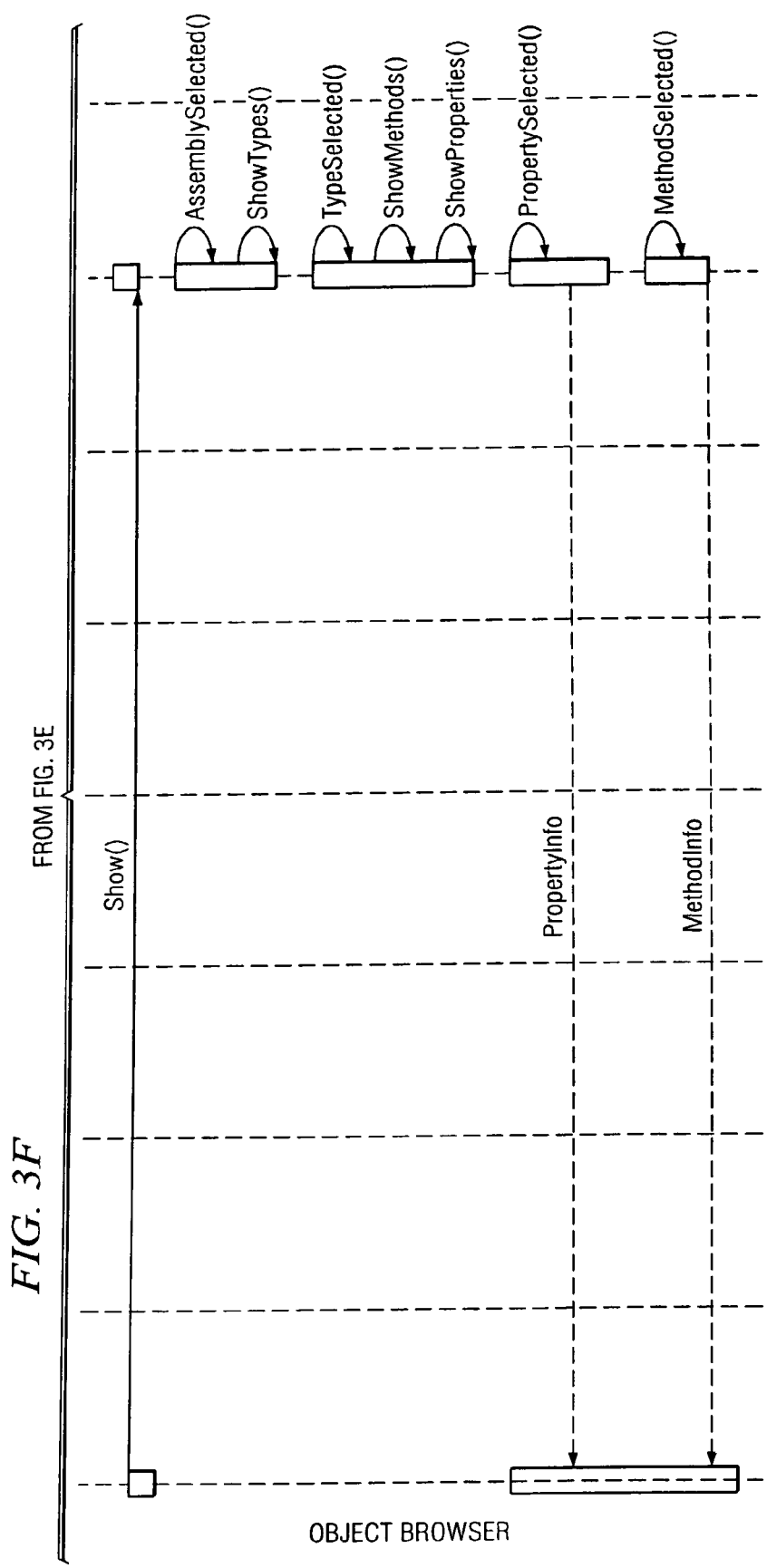

FIG. 2 illustrates one embodiment of Windows development environment 130 in system 100. This embodiment of Windows development environment 130 illustrates various processes distributed among a number of sub-modules, namely design engine 131 and web control host 133. As described above, each sub-module may be a library, function, service, method, or object written or described in any appropriate computer language including C, C++, Java, Visual Basic, assembler, any suitable version of 4GL, and others or any combination thereof. Further, each sub-module may be local or remote so long it remains communicably coupled with other appropriate sub-modules and components.

In the illustrated embodiment, design engine 131 is a diagram that offers a single access to all of the model design objects, thereby providing an efficient way to design and implement user interfaces for a windowed environment. Design engine 131 may also provide example displays of how a potential user would navigate through a set of windows, dialog boxes, and servers. Upon initialization, design engine 131 may call Windows design diagram 202. Window design diagram 202 presents the GUI form template or model including one or more windowed GUI elements such as, for example, windows, ActiveX controls, dialog boxes, drop-down menus, scroll bars, bitmaps, event processing, a pointer, and others. Design diagram 202 may also include a test procedure that enables just-in-time construction and runtime for selected portions of the Windows form. Once the developer completes the GUI form, Windows design diagram 202 may present the dynamically generated GUI form and/or promote it to an existing or new entity. Windows design diagram 202 is communicably coupled with web control host 133 through one or more interfaces. For example, the developer may select a web control option in design engine 131, thereby prompting design diagram 202 to execute or otherwise call web control host 133.

This example embodiment of web control host 133 includes or references various sub-modules including toolbox 203, browser control 204, property grid 205, and a plurality of web controls 210. Web control host 133 may include a host manager algorithm for managing or interfacing with these various sub-modules. For example, the host manager may responsible for creating or instantiating toolbox 203, web browser control 204, and property grid 205. In one embodiment, the host manager may be implemented as a standard .NET Windows Form with Design Host interface support (System.ComponentModel.Design.IDesignerHost). Toolbox 203 provides a list of installed third party web controls to the developer for selection at design time. For example, toolbox 203 may be populated by third party list 141. In one embodiment, toolbox 203 is implemented as a standard .NET Windows Form with Toolbox service interface support (System.ComponentModel.Design.IToolboxService). Toolbox 203 may also include or instantiate the control manager that allows the addition and removal of third party web controls to and from toolbox 203. Example browser control 204 is a Windows forms custom control that typically includes a web browser control, which may host one or more web controls 210. Property grid 205 is one embodiment of a window that allows the developer to add, modify, or remove properties associated with a particular third party or other web control 210. In one embodiment, property grid 205 is implemented as a standard .NET Windows form. Control manager 207 allows the addition and removal of third party web controls 210 to and from toolbox 203. In one embodiment, control manager 207 is implemented as a standard .NET Windows Form. Object browser 208 allows access to the public properties and methods for Dot Notation Support through toolbox 203. In one embodiment, object browser 208 is implemented as a standard .NET Windows Form.

As described above, web control 210 is an abstract, often strongly-typed object model including form-type controls and special-purpose controls. For example, web control 210 may be an ad rotator, button, calendar, checkbox, compare validator, data grid, hyperlink, image, link button, radio button, table, and/or text box. Of course, these web controls 210 are for example purposes only and web controls 210 may include any appropriate Microsoft .NET web control, as well as any suitable third party web control without departing from the scope of this disclosure.

It will be understood that the above sub-modules are for illustration purposes only and Windows development environment 130 may include none, some, or all of the illustrated components as well as components, libraries, or sub-modules not illustrated.

FIGS. 3A-F illustrate example portions of a sequence diagram 300 describing example operation of the sub-modules of distributed Windows development environment 130 in accordance with one embodiment of the present disclosure. At a high level sequence diagram 300 illustrates nine categories of actions including: initialization, methods/events, properties, moves/resizes, toolbox, help, destruction, contacts menu, and object browsing. It will be understood that these categories are for example purposes only in Windows development environment 130 include or process none, some, or all of the example categories as well as include other categories not illustrated. The initialization action typically involves initializing, creating, or instantiating one of the components or sub modules of Windows development environment 130. For example, design engine 131 may instantiate design diagram 202 for each GUI form to be developed or generated. As a developer selects web controls 210 from standard Windows control 132, design diagram 203 may instantiate web control host 133 as appropriate. The method/events actions allow a parent object to invoke a procedure that retrieves method or event lists from a child object. The properties actions allow the parent object to set or retrieve properties from the child object as appropriate. Through example web control host 133, the developer may move or resize web controls 210. Toolbox actions include two primary methods: create( ) and updatelist( ). As described above, toolbox 203 may retrieve or be otherwise populated by a list of third party web controls from third party list 141 and present the list to the developer. Further, toolbox 203 may provide the developer with the ability to add or remove third party web controls to third party list 141. Next, the illustrated help actions allow appropriate objects to present standard or customized help when requested by the developer or user. Next, in certain embodiments, Windows development environment 130 allows for the destruction of child objects as appropriate, thereby freeing memory and making the design and development of GUI forms more efficient. As illustrated, certain components of Windows development environment 130 are operable to display context menus or to capture the right mouse click as appropriate. Further, Windows development environment 130 may allow certain components to invoke object browser 208, which allows access to public properties and methods for Dot Notation support through getting and setting properties and method calls.

Figure 4A:
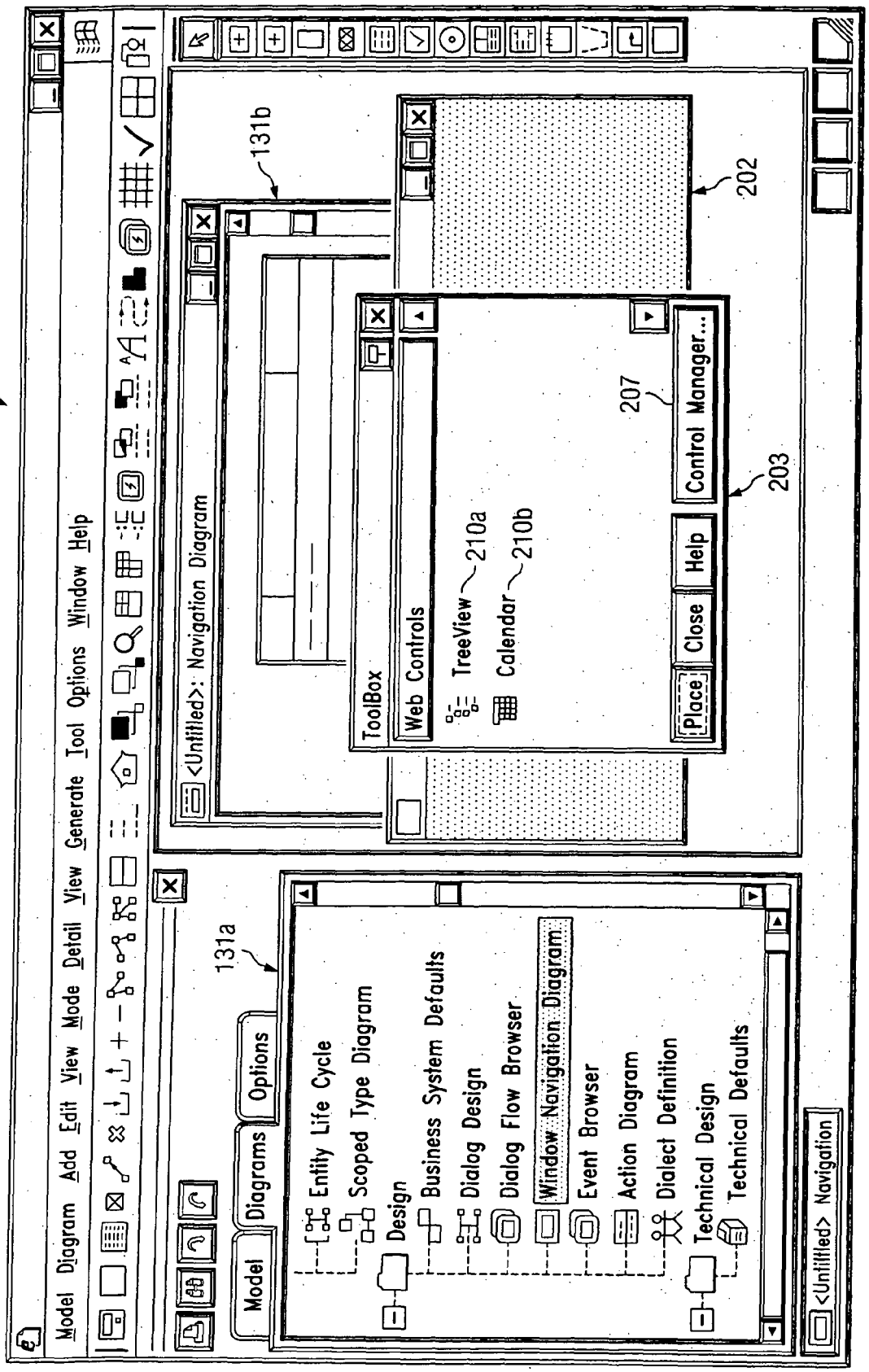
FIGS. 4A-G are example windows or dialog boxes presented by the system of FIG. 1 in accordance with one embodiment of the present disclosure.
Figure 4B:
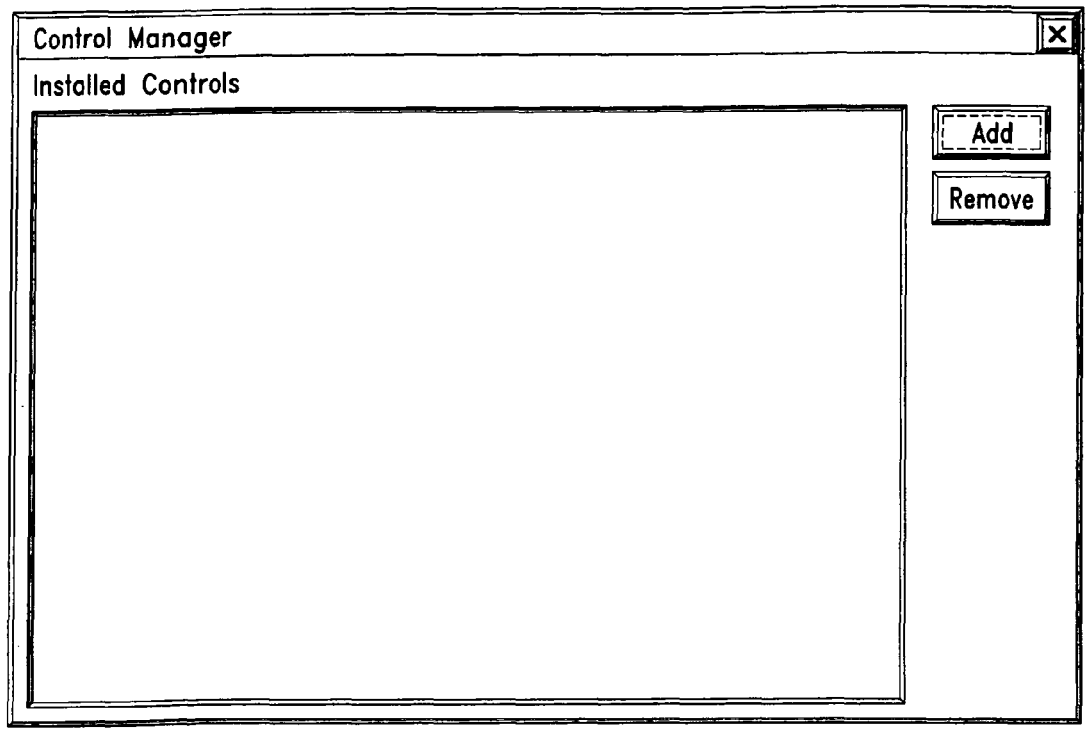
Figure 4C:
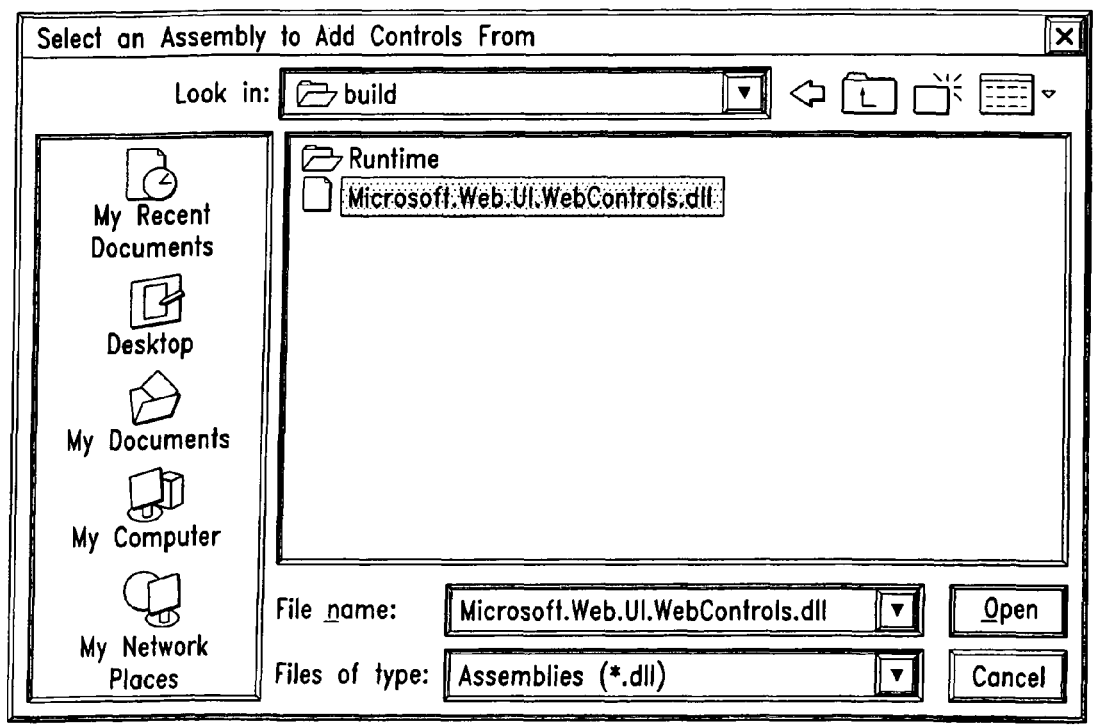
Figure 4D:
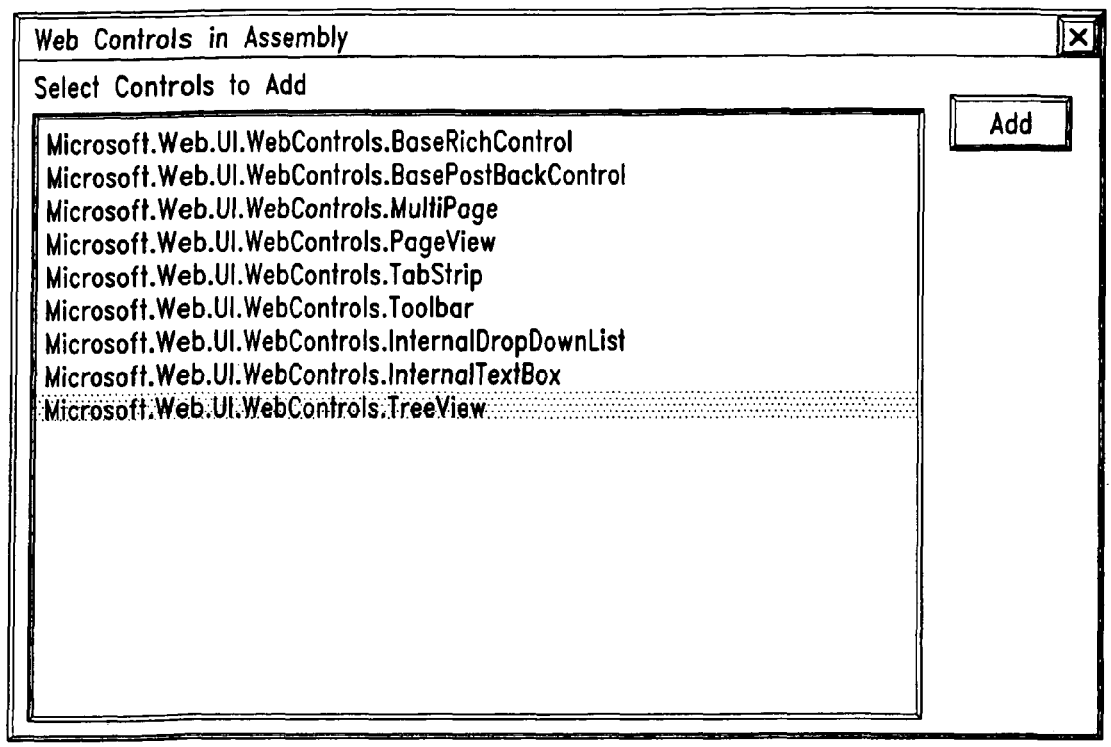
Figure 4E:
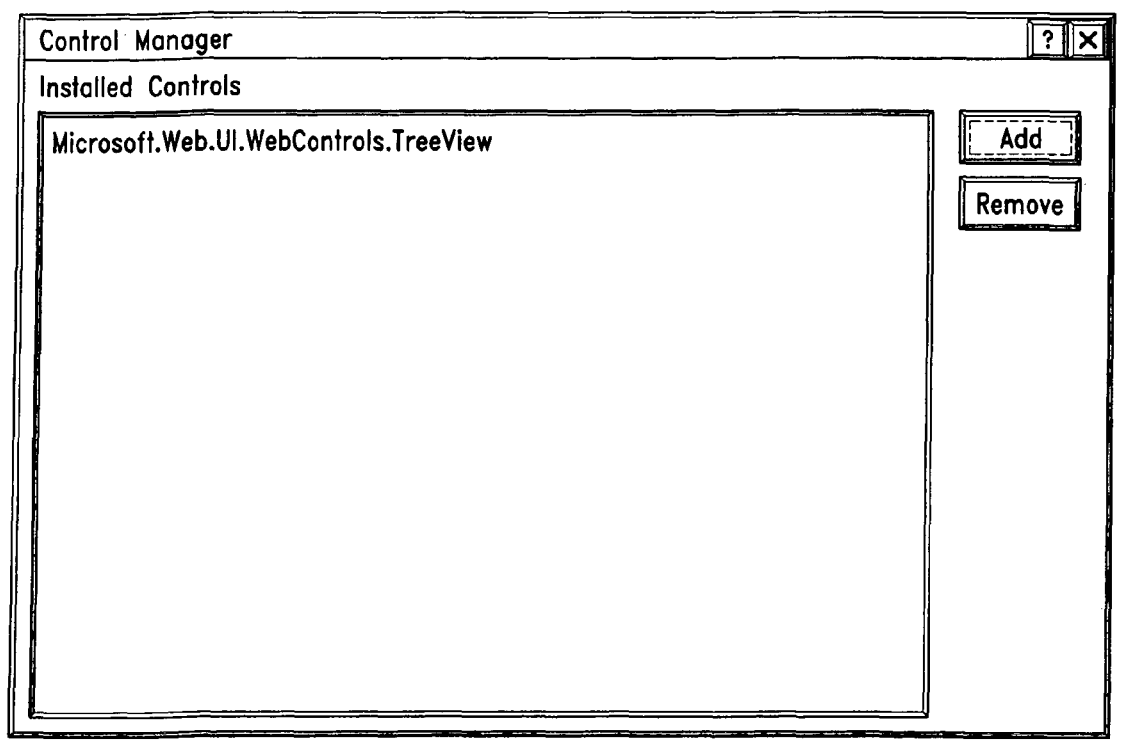
Figure 4F:
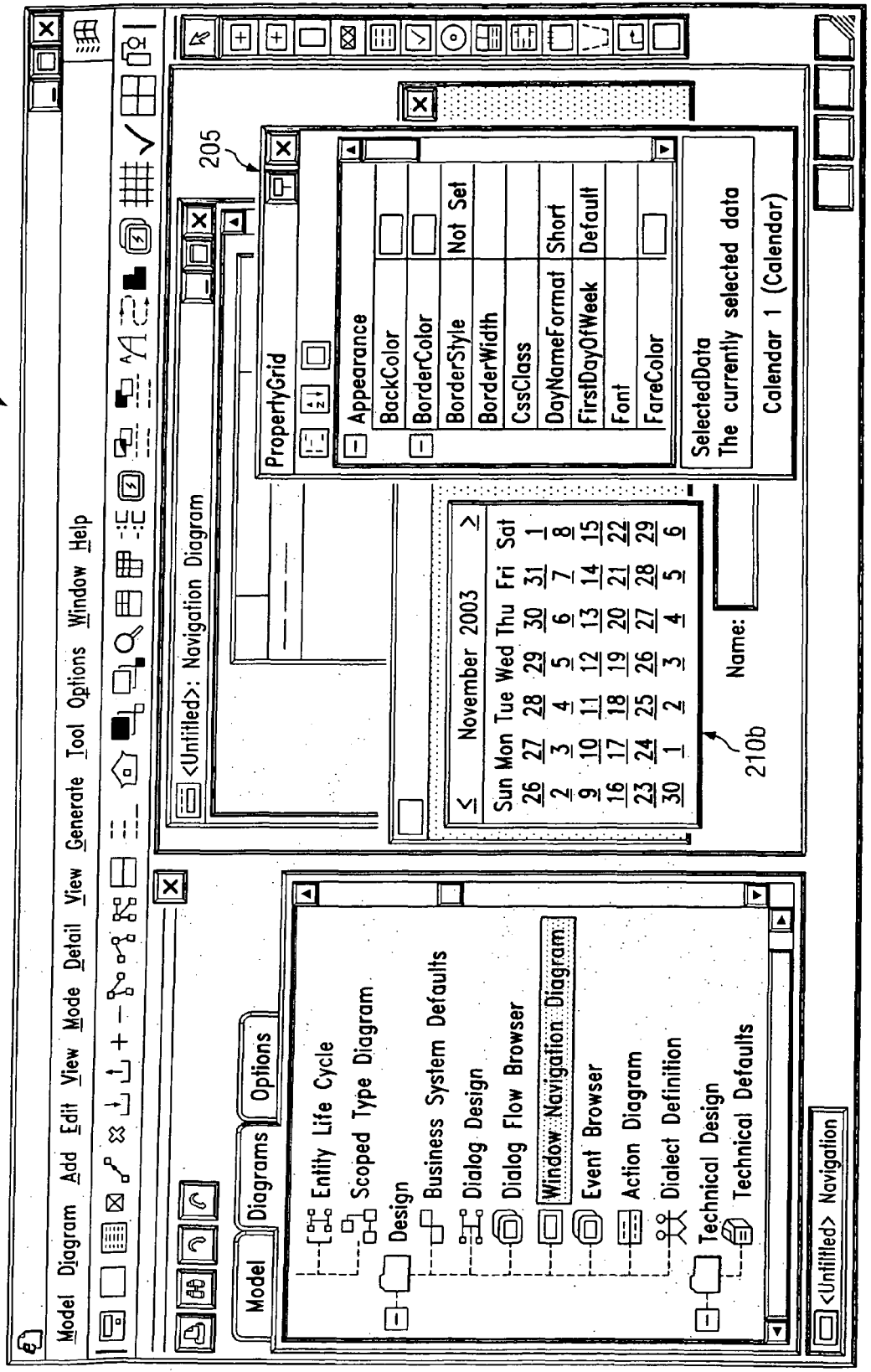
Figure 4G:
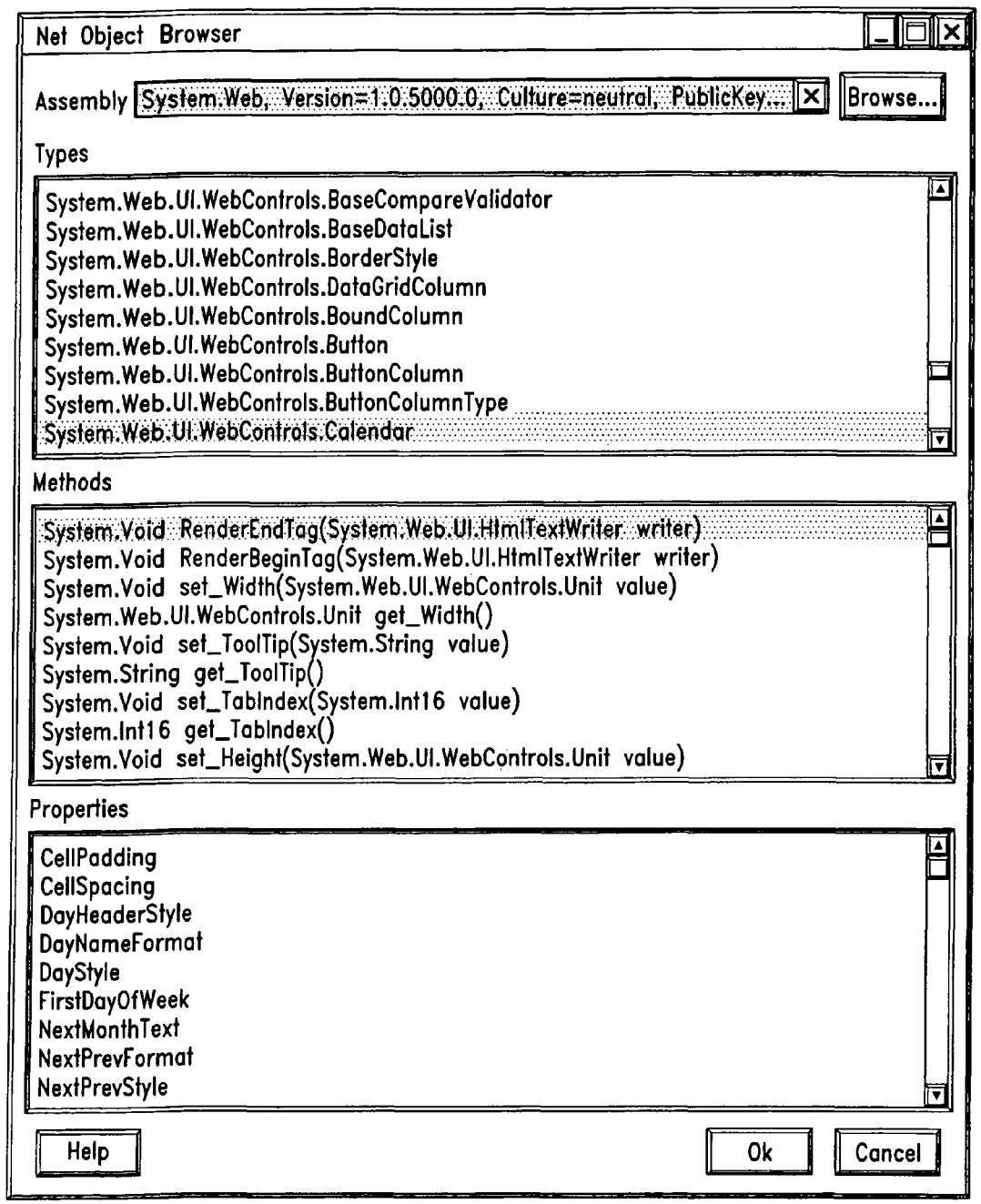

FIGS. 4A-G illustrate various example displays, windows, and dialog boxes presented by Windows development environment 130 in accordance with one embodiment of the present disclosure. FIG. 4A illustrates one example of a frontend for Windows development environment 130. This example includes design engine 131, a design diagram 202 with a GUI form template, and toolbox 203. Illustrated toolbox 203 presents two web controls to the developer for insertion into the GUI form template: TreeView and Calendar. If the developer desires to add one or more web controls 210 to toolbox 203, then he may select the presented "Control Manager" button, resulting in the child window illustrated in FIG. 4B. Upon selection of the "Add" button, at least the front-end of control manager 207 presents another child window allowing the develop to select .NET library 140 or other DLL, third party list 143, or any other appropriate file or listing, as illustrated in FIG. 4C. For example, FIG. 4C illustrates a library entitled "Microsoft.Web.UI.Webcontrols.dll." Once the developer selects the appropriate file or listing, the component web controls 210 are presented to him in FIG. 4D. Returning to the example, "Microsoft.Web.UI. Webcontrols.dll" includes example web controls: "BaseRichControl," BasePostBackControl," "MultiPage," "PageView," "TabStrip," "Toolbar," "InternalDropDownList," "InternalTextBox," "and "Tree View." In this example, the developer selects "TreeView," resulting in FIG. 4E, which in this embodiment is an updated view of FIG. 4B. After the developer inserts a web control 210 into the GUI form template, the developer may change or otherwise update the properties associated with the web control as illustrated in FIG. 4F. For example, the developer may right-click on web control 210, illustrated as a calendar, and select "properties" from the context menu. This selection may automatically trigger design engine 131 presenting property grid 205. FIG. 4G presents at least a front-end for object browser 208 allowing the developer or other user to select an assembly and get or set properties and call methods. In the illustrated embodiment, object browser 208. It will be understood that these figures illustrating GUI 116 are for example purposes only and GUI 116 may be any in appropriate format, layout, or language and may present any suitable graphical elements implementing functionality within the scope of this disclosure.

Figure 5:
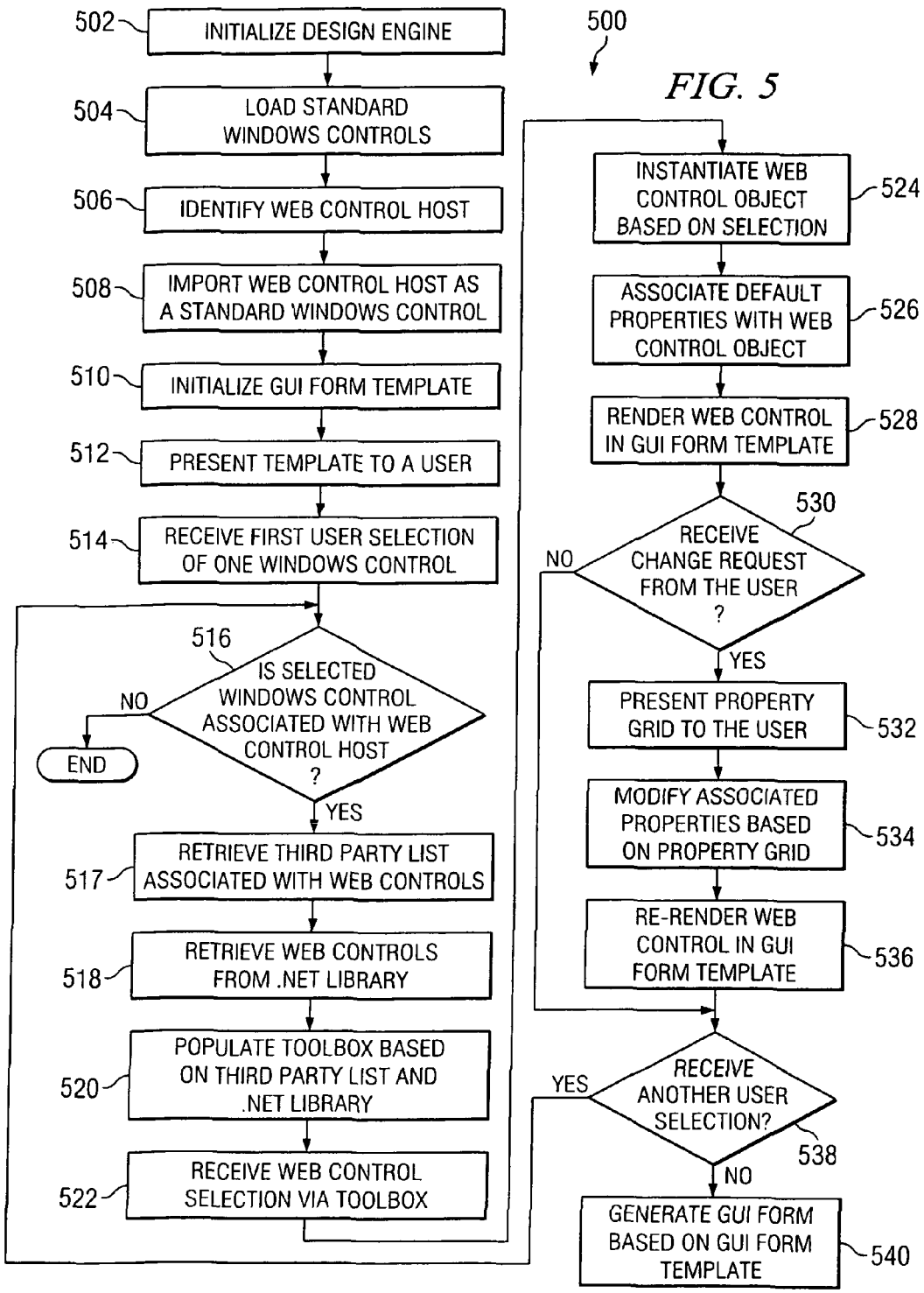
FIG. 5 is a flowchart illustrating an example method for generating web controls in accordance with one embodiment of the present disclosure.

FIG. 5 is a flowchart illustrating an example method 500 for generating web forms in accordance with one embodiment of the present disclosure. At a high level, method 500 includes initializing and populating various components of Windows development environment 130, presenting one or more web controls 210 to a developer as a standard Windows control, and generating a Windows form with at least one web control 210 inserted or otherwise embedded. The following description focuses on the operation of certain components of Windows development environment 130 in performing method 500. But system 100 contemplates using any appropriate combination and arrangement of logical elements implementing some or all of the described functionality.

Method 500 begins as step 502, where design engine 131 is initialized. Next, at step 504, Windows development engine 130 loads standard Windows controls 132 from any appropriate file such as a .NET library 140. Windows development engine 130 then identifies web control host 133 at step 506. For example, Windows development engine 130 may determine the local or remote location of the unmanaged DLL via the system registry. At step 508, Windows development engine 130 imports web control host 133 as a standard Windows control 132. Returning to the DLL example, Windows development engine 130 may dynamically load web control host 133 as necessary or at run-time. At step 510, Windows development engine 130 initializes a GUI form template. This form template may comprise a graphical model, a grid, or any other display, diagram, or window operable to include graphical elements. Once Windows development environment 130 has been properly initialized, the GUI form template is presented to the developer at step 512 and subsequently customized in steps 514 through 540.

Design engine 131 receives a first user selection of one Windows control 132 at step 514. Next, at decisional step 516, design engine 131 determines if the selected Windows control 132 is associated with web control host 133. If selected Windows control 132 is not associated with web control host 133 and is instead a standard Windows control, then design engine 131 will execute any appropriate algorithms, sub-modules or processing as appropriate (not illustrated). Otherwise, if selected Windows control 132 is associated with or includes web control host 133, then design engine 131 retrieves third party list 141 associated with third party web controls 210 at step 517. Next, design engine 131 retrieves .NET library 140 at step 518. Design engine 131 then populates a toolbar or toolbox based on retrieved third party list 141 in .NET library 140 at step 520. Once populated, design engine 131 may receive a user selection of a web control 210 via the toolbar at any appropriate time at step 522. Next, at step 524, design engine 131 instantiates a web control object based on the user selection. Design engine 131 then associates default properties with the instantiated web control object at step 526. Design engine 131 then renders the web control in GUI form template at step 528. Next, design engine 131 may receive a change request from the developer at decisional step 530. If so, then design engine 131 presents a property grid 205 to the developer at step 532. At step 534, design engine 131 modifies the associated properties based on property grid 205 and the user's selections therein. Next, design engine 131 re-renders the web control 210 in the GUI form template at step 536. Next, or if there was no change request from the user, design engine 131 determines if there is another user selection of a Windows control 132 for insertion in the GUI form template at decisional step 638. If design engine 131 does receive another user selection, then processing returns to step 516. Once the developer has substantially completed selecting various Windows controls 132, then design engine 131 generates a GUI form, display, or other front-end based on the designed GUI form template at step 640.

The preceding flowchart and accompanying description illustrate exemplary method 500. In short, system 100 contemplates using any suitable technique for performing this and other tasks. Accordingly, many of the steps in this flowchart may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations, and permutations of these embodiments and methods will be apparent to those skilled in the art. For example, Windows development engine 130 may allow the design, development, and generation of X-Windows applications in a Unix environment. Accordingly, the above description of example embodiments does not define or constrain this disclosure. Other changes, substitutions, and alterations are also possible without departing from the spirit and scope of this disclosure.

What is claimed is:

1. A method for generating an operating system (OS)-specific graphical user interface (GUI) form, the method comprising:

loading, by one or more processors of a design engine of the OS, a plurality of OS controls;

identifying, by the one or more processors of the design engine, at least one web control host that provides a plurality of web controls;

importing, by the one or more processors of the design engine, the at least one web control host;

associating the imported at least one web control host with at least one of the plurality of OS controls;

initializing a GUI form template;

displaying, by the one or more processors of the design engine, the plurality of OS controls, the plurality of OS controls including at least one OS-specific control and at least one OS control associated with the at least one web control host;

receiving, at the one or more processors of the design engine, a selection of one of the plurality of OS controls;

determining, by the one or more processors of the design engine, if the selected OS control is associated with the at least one web control host;

retrieving, by the one or more processors of the design engine, a list of the plurality of web controls associated with one of the at least one web control host when it is determined that the selected OS control is associated with the at least one web control host, wherein the list identifies the plurality of web controls stored in a library file;

displaying, by the one or more processors of the design engine, the plurality of web controls of the list;

receiving, at the one or more processors of the design engine, a selection of one of the plurality of displayed web controls for insertion into the GUI form template;

instantiating, by the one or more processors of the design engine, the selected web control;

rendering the selected web control in the GUI form template; and generating, by the one or more processors of the design engine, the OS-specific GUI form based on the GUI form template having at least one instantiated web control and at least one OS-specific control.

2. The method of claim 1, wherein the plurality of web control comprises third party web controls.

3. A system for generating an operating system (OS)-specific graphical user interface (GUI) form, the system comprising:

one or more processing devices configured to:
load a plurality of OS controls;
identify at least one web control host that provides a plurality of web controls;
import the at least one web control host;
associate the imported at least one web control host with at least one of the plurality of OS controls;
initialize a GUI form template;
display a GUI form template that includes a plurality of OS controls, the plurality of OS controls including at least one standard OS-specific control and at least one OS control associated with the at least one web control host;
receive a selection of one of the plurality of OS controls;
determine if the selected OS control is associated with the at least one web control host;
retrieve a list of the plurality of web controls associated with one of the at least one web control host when it is determined that the selected GUI is associated with the at least one web control host, wherein the list identifies the plurality of web controls stored in a library file;
display the plurality of web controls of the list;
receive a selection of one of the plurality of displayed web controls for insertion into the GUI form template;
instantiate the selected web control;
render the selected web control in the GUI form template; and
generate the OS-specific GUI form based on the GUI form template having at least one instantiated web control and at least one OS-specific control.

4. The system of claim 3, wherein the plurality of web control comprises third party web controls.

5. A computer readable storage medium storing computer executable instructions for generating an operating system (OS)-specific graphical user interface (GUI) form, the instructions when executed on one or more processors configuring the one or more processors to:

load a plurality of OS controls;
identify at least one web control host that provides a plurality of web controls;
import the at least one web control host;
associate the imported at least one web control host with at least one of the plurality of OS controls;
initialize a GUI form template;
display a GUI form template that includes the plurality of OS controls, the plurality of OS controls including at least one OS-specific control and at least one OS control associated with the at least one web control host;
receive a selection of one of the plurality of OS controls;
determine if the selected OS control is associated with the at least one web control host;
retrieve a list of the plurality of web controls associated with one of the at least one web control host when it is determined that the selected OS control is associated with the at least one web control host wherein the list identifies the plurality of web controls stored in a library file;
display the plurality of web controls of the list;
receive a selection of one of the plurality of displayed web controls for insertion into the GUI form template;
instantiate the selected web control;
render the selected web control in the GUI form template; and
generate the OS-specific GUI form based on the GUI form template having at least one instantiated web control and at least one OS-specific control.

6. The computer readable storage medium of claim 5, wherein the plurality of web control comprises third party web controls.

7. The method of claim 1, further comprising:
receiving, by the one or more processors of the design engine, a change request to modify one or more properties of the selected web control; and
generating, by the one or more processors of the design engine, a property grid that includes a selectable list of the one or more properties that are to be modified.

8. The method of claim 7, further comprising:
receiving a modification of the one or more properties; and
rendering the selected web control based on the modification.

9. The method of claim 1, wherein the plurality of web controls are based on controls distributed under the trademark .NET.

10. The method of claim 2, wherein the web control host is configured to instantiate a toolbox that provides a list of the third party web controls, and wherein the toolbox enables the addition and removal of third party web controls to and from the list.

11. The method of claim 10, wherein the toolbox is based on a framework distributed under the trademark .NET WINDOWS.

12. The method of claim 1, wherein the design engine is based on a library distributed under the trademark MICROSOFT FOUNDATION CLASS.

13. The system of claim 3, wherein the one or more processing devices are further configured to:
receive a change request to modify one or more properties of the selected web control; and
generate a property grid that includes a selectable list of the one or more properties that are to be modified.

14. The system of claim 13, wherein the one or more processing devices are further configured to:
receive a modification of the one or more properties; and
render the selected web control based on the modification.

15. The system of claim 3, wherein the plurality of web controls are based on controls distributed under the trademark .NET.

16. The system of claim 4, wherein the web control host is configured to instantiate a toolbox that provides a list of the third party web controls, and wherein the toolbox enables the addition and removal of third party web controls to and from the list.

17. The system of claim 16, wherein the toolbox is based on a framework distributed under the trademark .NET WINDOWS.

18. The computer readable storage medium of claim 5, wherein the one or more processors are further configured to:
receive a change request to modify one or more properties of the selected web control; and
generate a property grid that includes a selectable list of the one or more properties that are to be modified.

19. The computer readable storage medium of claim 18, wherein the one or more processors are further configured to:
receive a modification of the one or more properties; and
render the selected web control based on the modification.

20. The computer readable storage medium of claim 5, wherein the plurality of web controls are based on controls distributed under the trademark .NET.

21. The computer readable storage medium of claim 6, wherein the web control host is configured to instantiate a toolbox that provides a list of the third party web controls, and wherein the toolbox enables the addition and removal of third party web controls to and from the list.

22. The computer readable storage medium of claim 21, wherein the toolbox is based on a framework distributed under the trademark .NET WINDOWS.

* * * * *

UNITED STATES PATENT AND TRADEMARK OFFICE
CERTIFICATE OF CORRECTION

| | | |
|---|---|---|
| PATENT NO. | : 7,849,412 B2 | |
| APPLICATION NO. | : 10/851001 | |
| DATED | : December 7, 2010 | |
| INVENTOR(S) | : Jeffrey K. French | |

It is certified that error appears in the above-identified patent and that said Letters Patent is hereby corrected as shown below:

Col. 11, lines 12-13, claim 1, replace "loading, by one or more processors of a design engine of the OS, a plurality of OS controls"
    with -- loading, by one or more processors of a design engine of an OS, a plurality of OS controls --

Col. 11, lines 52-53, claim 2, replace "2. The method of claim 1, wherein the plurality of web control comprises third party web controls."
    with -- 2. The method of claim 1, wherein the plurality of web controls comprise third party web controls. --

Col. 11, line 65 to col. 12, line 3, claim 3, replace "display a GUI form template that includes a plurality of OS controls, the plurality of OS controls including at least one standard OS-specific control and at least one OS control associated with the at least one web control host;"
    with -- display the plurality of OS controls, the plurality of OS controls including at least one standard OS-specific control and at least one OS control associated with the at least one web control host; --

Col. 12, lines 7-12, claim 3, replace "retrieve a list of the plurality of web controls associated with one of the at least one web control host when it is determined that the selected GUI is associated with the at least one web control host, wherein the list identifies the plurality of web controls stored in a library file;"

Signed and Sealed this
Eighth Day of February, 2011

David J. Kappos
*Director of the United States Patent and Trademark Office*

CERTIFICATE OF CORRECTION (continued)

U.S. Pat. No. 7,849,412 B2 with -- retrieve a list of the plurality of web controls associated with the at least one web control host when it is determined that the selected OS control is associated with the at least one web control host, wherein the list identifies the plurality of web controls stored in a library file; --

Col. 12, lines 22-23, claim 4, replace "4. The system of claim 3, wherein the plurality of web control comprises third party web controls."
with -- 4. The system of claim 3, wherein the plurality of web controls comprise third party web controls. --

Col. 12, lines 36-39, claim 5, replace "display a GUI form template that includes the plurality of OS controls, the plurality of OS controls including at least one OS-specific control and at least one OS control associated with the at least one web control host;"
with -- display the plurality of OS controls, the plurality of OS controls including at least one OS-specific control and at least one OS control associated with the at least one web control host; --

Col. 12, lines 58-59, claim 6, replace "6. The computer readable storage medium of claim 5, wherein the plurality of web control comprises third party web controls."
with -- 6. The computer readable storage medium of claim 5, wherein the plurality of web controls comprise third party web controls. --